UNITED STATES PATENT OFFICE.

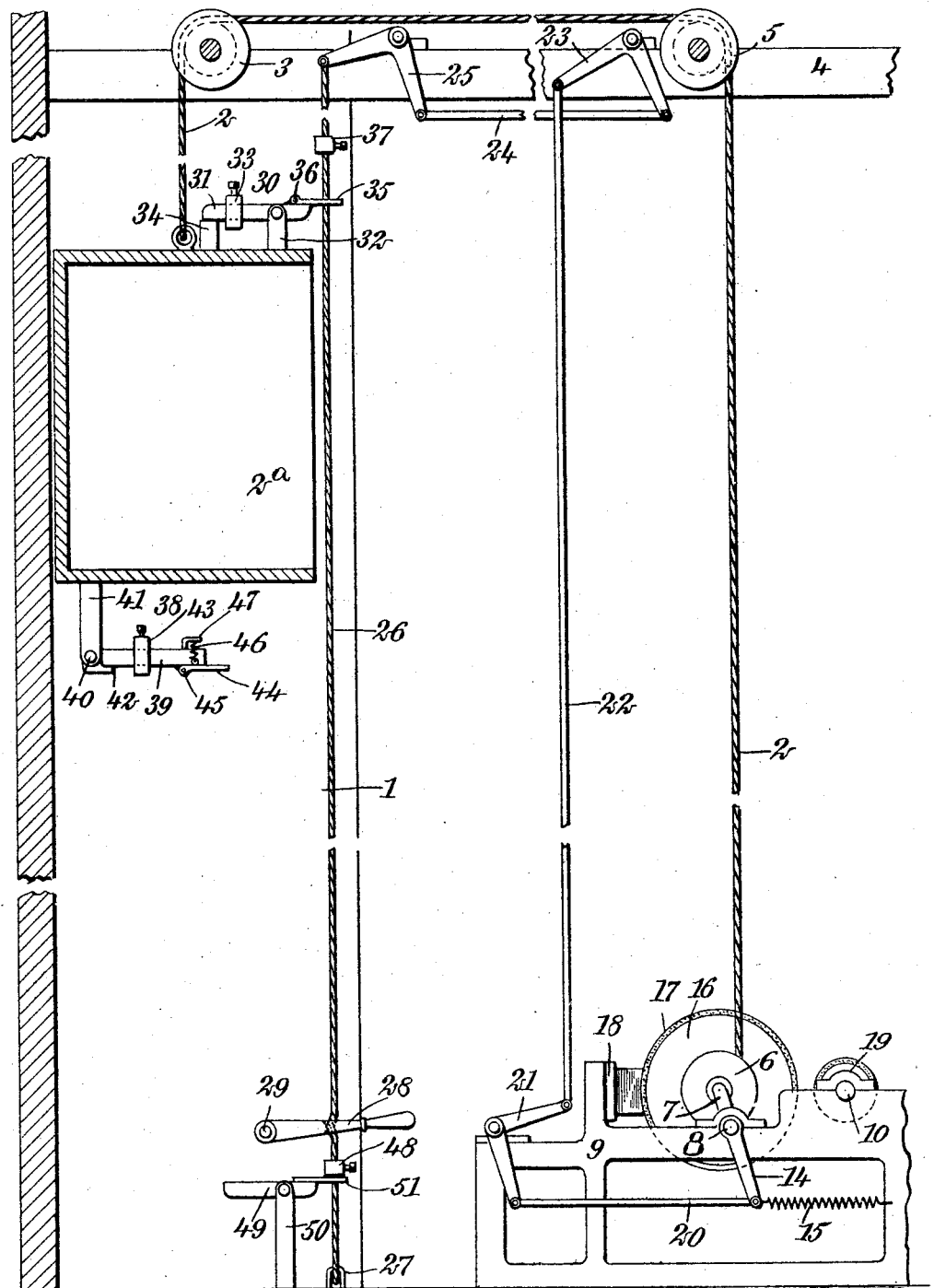

CHARLES ANDREW STURM AND ROY NELSON FLACK, OF PORTLAND, OREGON.

DUMB-WAITER OR ELEVATOR.

No. 929,342.   Specification of Letters Patent.   Patented July 27, 1909.

Application filed May 9, 1908. Serial No. 431,778.

*To all whom it may concern:*

Be it known that we, CHARLES A. STURM and ROY N. FLACK, citizens of the United States, and residents of Portland, in the county of Multnomah and State of Oregon, have invented a new and Improved Dumb-Waiter or Elevator, of which the following is a full, clear, and exact description.

This invention relates to dumb waiters or elevators, and particularly to those which are controlled by an operating cable passing through or adjacent to the car or cage.

The invention is intended especially to be used where the dumb waiters or cages are operated from a point outside of the cage or dumb waiter.

The object of the invention is to provide improved means for indicating to the operator of the dumb waiter when the car has arrived at the end of its travel up or down.

The invention consists in the construction and combination of parts to be more fully described hereinafter and particularly set forth in the claims.

Reference is to be had to the accompanying drawings, forming a part of this specification, in which similar characters of reference indicate corresponding parts and in which the figure is a vertical central section showing the arrangement of the mechanism within a building, certain parts being broken away.

Referring more particularly to the parts, 1 represents an elevator or dumb-waiter shaft in which a cage 2ᵃ is mounted vertically, said cage being suspended upon a cable 2 which passes upwardly and around a sheave 3 carried on a beam 4, as indicated. From this sheave 3, the cable passes over horizontally to a guide sheave 5, whence it passes downwardly and around the drum 6. The drum is mounted upon a wrist or crank 7, formed upon a shaft or hanger 8, and this hanger is supported rotatably in a frame 9. Fastened longitudinally in this frame 9, there is mounted a main or driving shaft 10, which shaft is driven continuously in any suitable manner. The shaft 8 is provided with a rigid arm 14, which extends downwardly therefrom, as indicated in the figure. To the lower end of this arm 14, a spring 15 is attached, which tends to pull the shaft of the drum toward one side and away from the driving shaft 10. The drum 6 is provided with a friction wheel 16, which has a friction driving face 17 of paper or similar material. Opposite this friction wheel 16, a brake or brake shoe 18 is attached on the frame as indicated. When the shaft 8 is entirely under the influence of the spring 15, this friction wheel 16 is held over against the brake 18, as will be readily understood.

On the main shaft 10, a friction driving wheel 19 is provided, which is faced with paper or similar material, and is in alinement with the friction wheel 16. The arrangement is such that if the arm 14 is pulled away from the main shaft 10 it will move the friction wheel 16 out of contact with the brake shoe and into contact with the driving wheel 19. When in contact with the driving wheel, the shaft 10 operates to drive the drum in a direction to wind up the cable thereabout, as will be readily understood. In order to operate the arm 14, it is connected by a link 20 with a bell crank lever 21 mounted upon the frame as shown. This bell crank lever 21 is connected by a link 22 with a similar bell crank lever 23 mounted overhead. This bell crank lever 23 is connected by a link 24 with a bell crank lever 25, mounted near the elevator shaft.

In the elevator shaft a vertically-disposed operating cable 26 is provided; the lower end of which cable is anchored to an anchor-plate 27 in the floor, and the upper end of the cable is attached to an arm of the bell crank lever 25. The spring 15 normally holds the mechanism in the relation shown in the figure, the operating cable 26 being taut.

In order to operate the cage 2ᵃ, the shaft is provided with an operating lever 28, which is pivotally mounted at 29 on the side of the shaft and is attached to the cable as indicated, near its outer end. By moving this lever down, the bell crank levers will all be rocked on their points of support, so as to draw the link 20 away from the driving shaft 10, and in this way the friction wheel 16 may be brought against its driving wheel 19, whereupon the elevator cage will rise. If it is desired to lower the cage, the lever should be moved up, so as to allow the spring 15 to draw the friction wheel 16 over against the brake shoe 18. If the full force of the spring 15 exerts itself upon the brake shoe in this way, it will hold the drum against rotation, but by exerting some force upon the lever, the strength of the spring may be partially overcome, so that the friction developed will be reduced sufficiently to permit the drum to rotate and the weight of the cage will then cause it to descend. The cage may be stopped at any point by releasing the lever.

We provide trip devices for indicating when the cage is at the ends of its travel up or down. The upper trip device 30 is located at the top of the cage and consists of a lever 31 pivotally mounted upon a fixed bracket 32. The long arm of this lever projects away from the cable and is provided with an adjustable counterweight 33. The end of the lever rests upon a fixed block 34 at the top of the cage as shown. The forward arm of the lever is provided with a trip plate 35, which is pivoted at 36 to the upper side of the lever. In its normal position, this trip plate is supported by the forward end of the lever in a horizontal position. At the upper end of the cable 26, at a suitable point, a fixed collar 37 is adjustably attached. In the operation of the cage, as it reaches the limit of its upward movement, the trip plate 35 will strike the collar 37 and give the cable 26 an upward jerk. This notifies the operator pulling the lever 28, that the cage is at the end of its upward movement of travel. If the operator does not throw the lever 28 immediately to its off position, the trip device 30 will pass the collar 37 by tipping its long arm 31 upwardly. In this connection, it should be understood that when the trip plate 35 strikes the collar, it is turned downwardly until it clears the collar.

In the return or downward movement of the cage, the trip plate 35 rotates upwardly about the pivot 36, so as to permit the trip device to descend past the collar, as will be readily understood. A somewhat similar arrangement is provided for notifying the operator when the cage reaches the lower limit of its travel. For this purpose, we provide a trip device 38, which consists of a trip lever 39, rotatably mounted upon a pivot 40 at the lower end of a bracket 41, fixed to the under side of the cage. This bracket 41 is provided with a projecting toe 42, which normally supports the lever 39 in a horizontal position. On this lever 39, there is mounted an adjustable counterweight 43, and on the under side of the lever, at its end, there is provided a trip plate 44, which is pivoted to the lever at 45 and is normally held in a horizontal position against the under side of the lever by a spring 46, the upper end of which spring is attached to a suitable bracket 47, as indicated. Near the lower end of the cable, a fixed collar 48 is adjustably attached, and this collar is in contact with a base lever 49, which is pivotally mounted upon a bracket 50 at the floor. This lever 49 has a long arm which projects into the path of the trip plate 44, and a short arm having an extension or finger 51, which engages the under side of the collar 48. By this arrangement, when the cage reaches the lower limit of its movement, the trip plate 44 strikes the lever 49, so as to depress its long arm. This gives a shock to the collar 48 and to the cable. The lever 39 may rotate upwardly on its pivot 40, so as to permit the trip device 38 to pass the base lever 49 in a manner suggested in connection with the trip device 30. The pivoted trip plate 44 enables the trip device 39 to pass the lever 49 in its upward movement, as will be readily understood, as the spring 46 will expand itself, so as to enable the plate 44 to clear the lever.

Having thus described our invention, we claim as new and desire to secure by Letters Patent:

1. In an elevator, in combination, a shaft, a cage adapted to rise and fall therein, an operating member extending longitudinally of said shaft, mechanism controlled by said operating member for moving said cage, a collar carried by said operating member, near the limit of movement of said cage, a lever pivotally mounted on said cage and normally projecting outwardly so as to strike said collar at the limit of movement of said cage, and a counterweight carried by said lever, whereby said lever may impart a shock to said operating member when said cage reaches said collar.

2. In elevator mechanism, in combination, an elevator shaft, a cage moving therein, mechanism for actuating said cage, an operating member extending longitudinally in said shaft, a lever connected with said operating member and controlling said mechanism, collars carried by said operating member near the limits of movement of said cage, a pivoted trip device carried by said cage for engaging one of said collars, a second trip device carried by said cage, and means actuated thereby for striking the other of said collars said trip devices affording means for producing a shock on said lever, indicating when the cage has reached the end of its travel.

3. In elevator mechanism, in combination, an elevator shaft, a cage moving up and down in said shaft, an operating member extending longitudinally of said shaft, mechanism for actuating said cage but controlled by said operating member, a lever having a fixed pivot and attached to said operating member, a collar carried by said operating member near the limit of movement of said cage, and a movable trip device carried by said cage and adapted to strike said collar at the limit of movement of said cage, said trip device being adapted to pass said collar and affording means for imparting a shock to said lever.

4. In an elevator, in combination, an elevator shaft, a cage moving up and down therein, an operating cable extending longitudinally of said shaft, mechanism controlled by said cable for operating said cage, collars carried by said cable, a pivoted trip lever mounted on said cage, a trip plate pivotally mounted on said trip lever and normally projecting outwardly, so as to strike one of the said collars, a second trip lever carried by said cage and having a movable trip plate, and a third lever having a fixed pivot engaging said second collar and in the path of said last-named trip plate and counterweights carried by said trip levers, said counterweights affording means for imparting a shock to said cable, when said collars are struck by said trip plates.

In testimony whereof we have signed our names to this specification in the presence of two subscribing witnesses.

CHARLES ANDREW STURM.
ROY NELSON FLACK.

Witnesses:
J. S. Foss,
D. A. Jones.